United States Patent
Nishikawa et al.

(10) Patent No.: US 6,785,069 B2
(45) Date of Patent: Aug. 31, 2004

(54) MAGNETIC TRANSFER METHOD

(75) Inventors: Masakazu Nishikawa, Odawara (JP); Seiichi Watanabe, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 374 days.

(21) Appl. No.: 09/942,766

(22) Filed: Aug. 31, 2001

(65) Prior Publication Data

US 2002/0051307 A1 May 2, 2002

(30) Foreign Application Priority Data

Sep. 4, 2000 (JP) .................................. 2000-266698

(51) Int. Cl.$^7$ ................................................ G11B 5/86
(52) U.S. Cl. ............................................................ 360/17
(58) Field of Search ............................ 360/15, 16, 17, 360/77.08, 131, 135, 75; 369/84; 428/694 BR

(56) References Cited

U.S. PATENT DOCUMENTS 3,869,711 A * 3/1975 Bernard et al. ............... 360/17
6,347,016 B1 * 2/2002 Ishida et al. .................. 360/17

FOREIGN PATENT DOCUMENTS

| EP | 0915456 | 5/1999 |
|----|---------|--------|
| JP | 63183623 A | 7/1988 |
| JP | 10040544 A | 2/1998 |
| JP | 10269566 A | 10/1998 |

* cited by examiner

Primary Examiner—Alan T. Faber
(74) Attorney, Agent, or Firm—Sughrue Mion, PLLC

(57) ABSTRACT

The present invention provides a magnetic transfer method for transferring information by bringing a master carrier for magnetic transfer and a slave medium into close contact with each other and by applying a magnetic field for transfer, said master carrier comprising servo areas and data areas, said servo areas are convex, and difference of height between the data areas and the servo areas is within the range of 50–800 nm.

3 Claims, 3 Drawing Sheets

MAGNETIC TRANSFER METHOD

BACKGROUND OF THE INVENTION

The present invention relates to a magnetic transfer method for transferring a recorded information to a magnetic recording medium used in a magnetic recording and reproducing system of large capacity and high recording density. In particular, the invention relates to a magnetic transfer method used in the recording of servo signal, address signal and other normal signal such as video signal, audio signal, data signal, etc. to a magnetic recording medium of large capacity and high recording density.

With rapid progress in the utilization of digital image, the amount of information to be handled in devices such as personal computer is now extensively increased. With the increase of the amount of information to be handled, there are now strong demands on a magnetic recording medium, which has large capacity for information recording and can be produced at low cost, and which requires shorter time for recording and reading.

In a high-density recording medium such as hard disk or large-capacity removable type magnetic recording medium such as ZIP (Iomega Inc.), information recording area has narrower tracks compared with floppy disk. In order that a magnetic head scans over tracks with narrow width and signals are recorded and reproduced at high S/N ratio, it is necessary to perform accurate scanning using tracking servo technique.

In this respect, in a large-capacity magnetic recording medium such as hard disk, removable type magnetic recording medium, etc., there are provided areas where servo signal for tracking, address information signal, reproduction clock signal, etc. are recorded at a given angular distance with respect to one turn of the disk. The magnetic head reproduces these signals at a given spacing and scans accurately over the tracks while confirming and correcting the position of the head. These signals are recorded on the magnetic recording medium in advance when the magnetic recording medium is manufactured, and it is called "pre-format".

Accurate positioning is required for the recording of servo signal for tracking, address information signal, reproduction clock signal, etc., and the pre-format recording is generally practiced by the magnetic head under strict position control using a special-purpose servo recording system after the magnetic recording medium has been incorporated in the drive.

However, in the pre-format recording of servo signals, address information signal, reproduction clock signal, etc. by the magnetic head, recording is performed under strict position control of the magnetic head using a special-purpose servo recording system, and recording is performed one by one and track by track. Thus, long time is required for the pre-format recording. Also, with rapid increase of magnetic recording density, the amount of signals to be recorded in the pre-format recording is increased, and this means that still more time is required. The cost required for the pre-format recording process of signals such as servo signal in total manufacturing cost is increased in the production of the magnetic recording medium, and there are now strong demands on the reduction of the cost in this process.

On the other hand, a method has been proposed, in which the pre-format information is not recorded track by track, but it is transferred from the master carrier to the slave medium by magnetic transfer. For instance, such transfer technique is described in JP-63183623(A), JP-10040544(A), (EP-0915456) and JP-10269566(A).

According to the method described in JP-10040544(A) or JP-10269566(A), convex and concave portions to correspond to information signals are formed on the surface of the substrate used as the master carrier for magnetic transfer. Ferromagnetic thin film is formed at least on the surface of the convex portions. The surface of this master carrier is brought into contact with the surface of a sheet-type or a disk-type magnetic recording medium where a coating layer containing ferromagnetic thin film or ferromagnetic power is formed. Or, AC bias magnetic field or DC magnetic field is applied, and the ferromagnetic material on the surface of convex portion is excited. As a result, magnetized pattern corresponding to convex and concave portion is recorded on the magnetic recording medium.

According to this method, the surface of convex portion of the master carrier for magnetic transfer is brought into close contact with the magnetic recording medium to be pre-formatted, i.e. the slave medium, and the ferromagnetic material in the convex portion is excited. Then, a given pre-format information is recorded on the slave medium. Static recording can be carried out without changing relative position of the master carrier for magnetic transfer and the slave medium. Accurate pre-format recording can be achieved, and the time required for the recording is very short.

In the magnetic transfer method as described above, the master carrier for magnetic transfer and the slave medium are brought into close contact with each other in static state, and magnetic transfer is performed. Therefore, damage occurs less frequently on the master carrier for magnetic transfer and the slave medium in the process of servo signal recording, and high durability can be expected in this method.

However, when the master carrier for magnetic transfer and the slave medium are brought into contact with each other and magnetic field is applied for magnetic transfer and this process is repeatedly carried out, signal dropout may occur. Thus, the signal recorded in the servo areas does not fulfill the function of the servo signal. As a matter of fact, this cannot be used as a magnetic recording medium.

After performing analysis on signal dropout, it was found that the signal dropout is usually caused due to poor adhesion between the master carrier for magnetic transfer and the slave medium.

It is an object of the present invention to provide a magnetic transfer method, by which it is possible to accurately transfer servo signal to the slave medium without resulting in dropout of some of the signal in a process to form servo areas on the slave medium. This is an indispensable process in the magnetic transfer from the master carrier to the slave medium and in the use of the slave medium as a large-capacity magnetic recording medium.

SUMMARY OF THE INVENTION

The above problems can be solved by the magnetic transfer method of the present invention. The present invention provides a magnetic transfer method for transferring information by bringing a master carrier for magnetic transfer and a slave medium into close contact with each other and by applying a magnetic field for transfer, the master carrier comprising servo areas and data areas, the servo areas are designed on convex form, and difference of height between the data area and the servo area is within the range of 50–800 nm.

The present invention also provides the magnetic transfer method as described above, wherein the master carrier for magnetic transfer has projections not higher than the height of the servo area and being disposed on the data area.

DESCRIPTION OF THE PREFERRED EMBODIMENT

Figure 1:
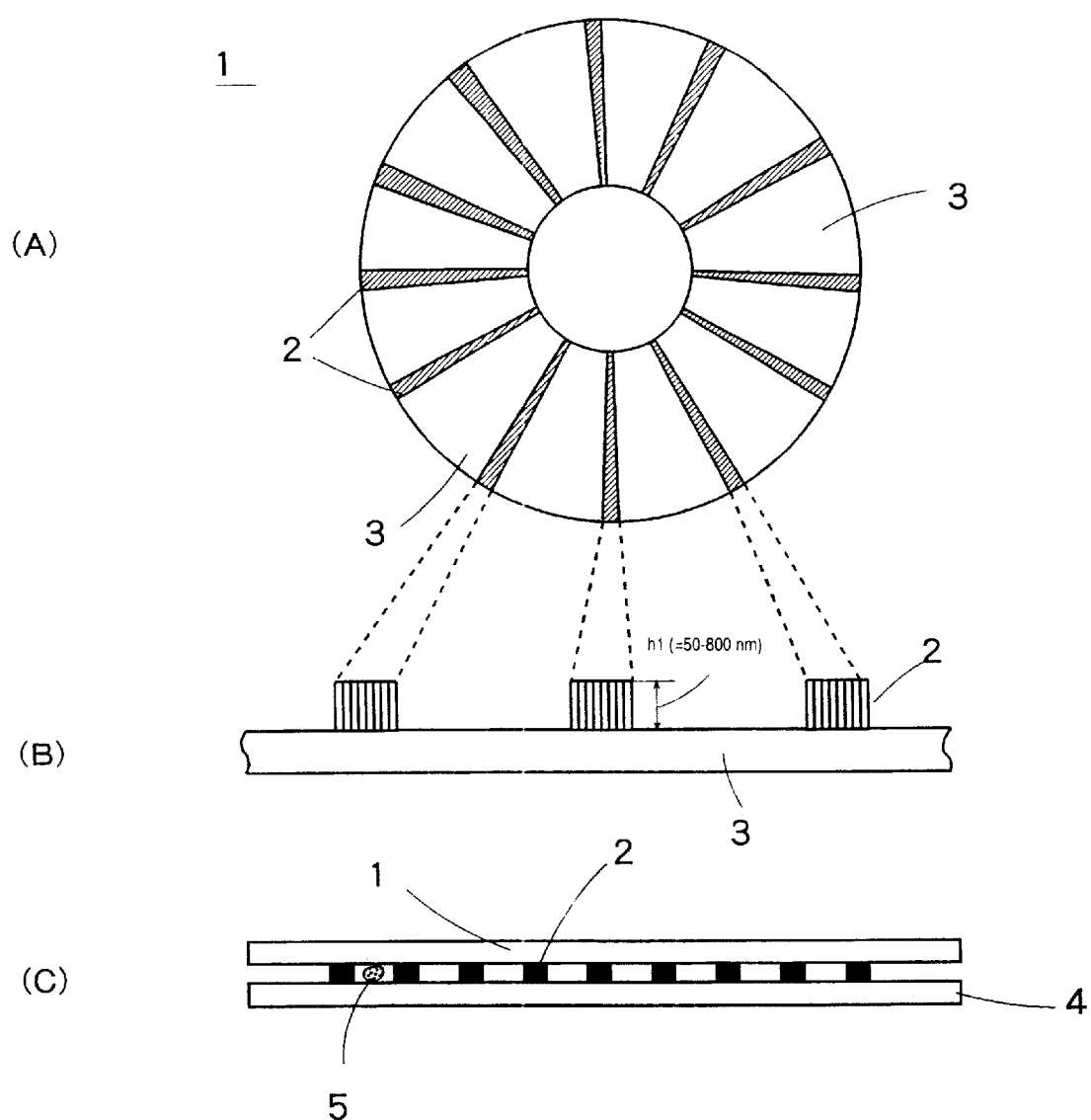
FIG. 1 represents drawings to explain a master carrier for magnetic transfer to be used in the magnetic transfer method of the present invention.

The magnetic transfer method according to the present invention is used to prevent dropout of servo signal due to poor adhesion when a master carrier for magnetic transfer and a slave medium are brought into close contact with each other and a servo signal is transferred from the master carrier for magnetic transfer to the slave medium by applying magnetic field for transfer.

Description will be given below on the present invention referring to the drawings.

FIG. 1 represents drawings to explain a master carrier for magnetic transfer to be used in the magnetic transfer method of the present invention. FIG. 1(A) is a plan view, FIG. 1(B) is a partial cross-sectional view, and FIG. 1(C) is a cross-sectional view to explain when the master carrier for magnetic transfer and the slave medium are brought into close contact with each other.

In servo areas 2, servo signals of a master carrier for magnetic transfer 1 are distributed regularly on the surface of a magnetic recording medium. In general, the servo areas occupy less than 10% of total area of the magnetic recording medium. When servo areas 2 are designed in convex form with respect to data areas 3 on the master carrier for magnetic transfer, data signal areas occupying more than 90% of the area of the master carrier for magnetic transfer are in concave form. When the master carrier 1 and the slave medium 4 are brought into close contact with each other, air is easily discharged from the gaps between these two components. Even when dust and other objects are present as attached objects 5 on the master carrier, the attached objects are caught in concave portions of the data areas. This prevents deformation of the master carrier for magnetic transfer due to the attached objects and contributes to the improvement of adhesion or fitness between the master carrier and the slave medium, and dropout of the transferred signal can be prevented.

Further, after careful study and analysis, it has been found that signal dropout due to the attached objects can be prevented and adhesion of these two components can be extensively improved when most of the portion of the master carrier for magnetic transfer is designed in concave form. It has been also found that the reproduction of servo signals transferred and recorded on the slave medium is specifically distorted at a portion between the servo area and the data area.

After carefully studying the data areas and the servo areas, it has been found that, when the master carrier and the slave medium are brought into close contact with each other, stronger force is applied on a portion near the servo signal area compared with the portion distant from the servo signal area. As a result, the slave medium is distorted at the end of the pattern on the servo area, and transfer condition is changed, and this leads to the signal distortion.

To solve these problems, according to the present invention, difference of height or level of the data area and the servo area is set to a specific range for the purpose of preventing abnormal transfer condition generated at the boundary of the data area and the servo area. More precisely, compared with the data area, height h1 of the servo area is set to the range of 50–800 nm. This makes it possible to prevent dropout of signals due to attachment of foreign objects and abnormal transfer due to deformation of the contact portion. When the height is less than 50 nm, poor adhesion occurs on the servo area due to attachment of foreign objects, and this may lead to dropout of the servo signal. On the other hand, if it is more than 800 nm, deformation due to the difference of height between the data area and the servo area is increased, and this may result in abnormal transfer.

Figure 2:
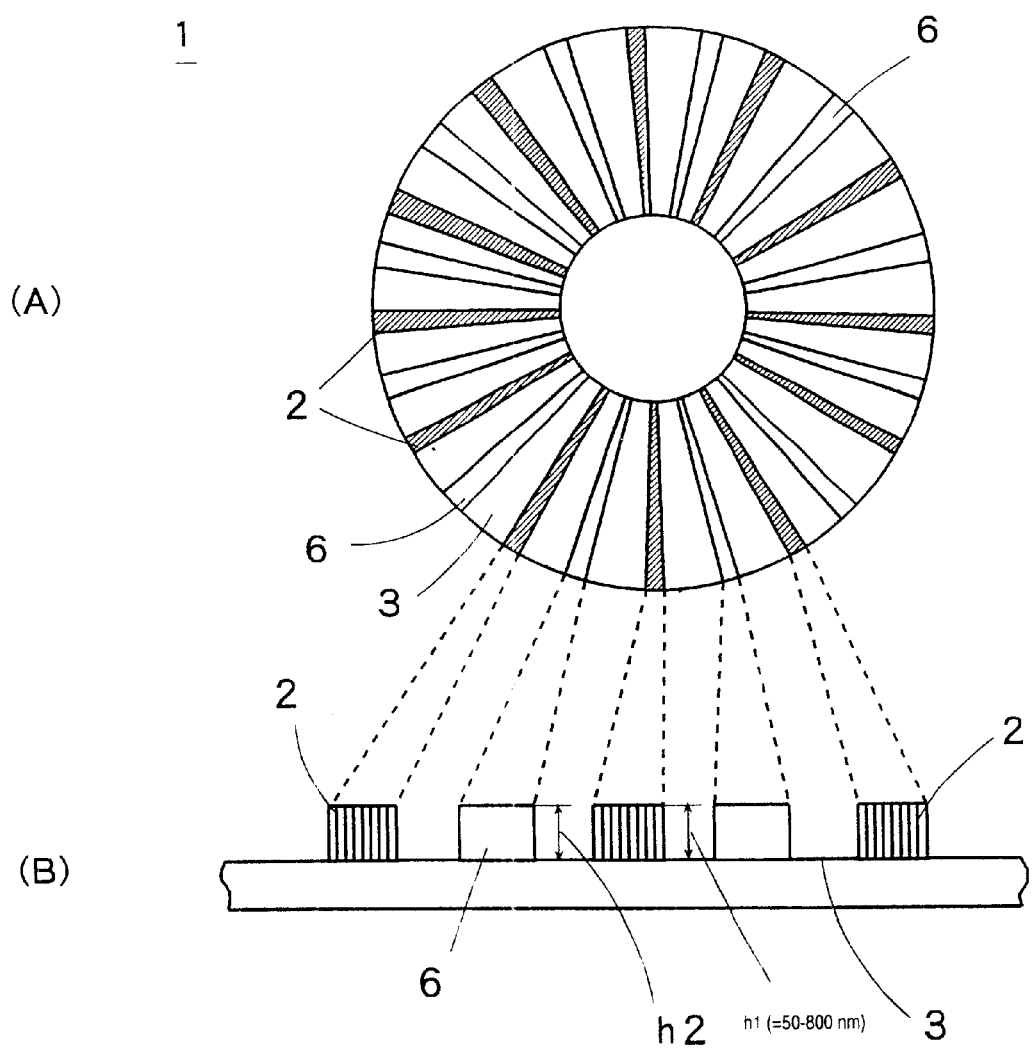
FIG. 2 represents drawings to explain another example of a master carrier for magnetic transfer to be used in the magnetic transfer method of the present invention.

FIG. 2 represents drawings to explain another example of the master carrier for magnetic transfer to be used in the magnetic transfer method of the present invention. FIG. 2(A) is a plan view, FIG. 2(B) is a partial cross-sectional view, and FIG. 2(C) is a cross-sectional view of still another example.

The servo areas 2 where servo signals of the master carrier 1 are recorded are designed in convex form with respect to the data areas 3, and radial projections 6 are formed on the data signal area of the master carrier for magnetic transfer. This contributes to the prevention of deformation, which occurs when the master carrier and the slave medium are brought into close contact with each other.

By providing the projections, the deformation of the slave medium facing to the data area can be prevented, and this contributes to the reduction of waveform distortion. As a result, poor transfer at the boundary between the data area and the servo area can be prevented.

It is preferable that projection height h2 is not more than the height h1 of the servo area. The width of the projection is preferably in the range of 10–100 $\mu$m at a position of 20 mm in radius. Two or more projections may be provided between the servo areas.

Figure 3:
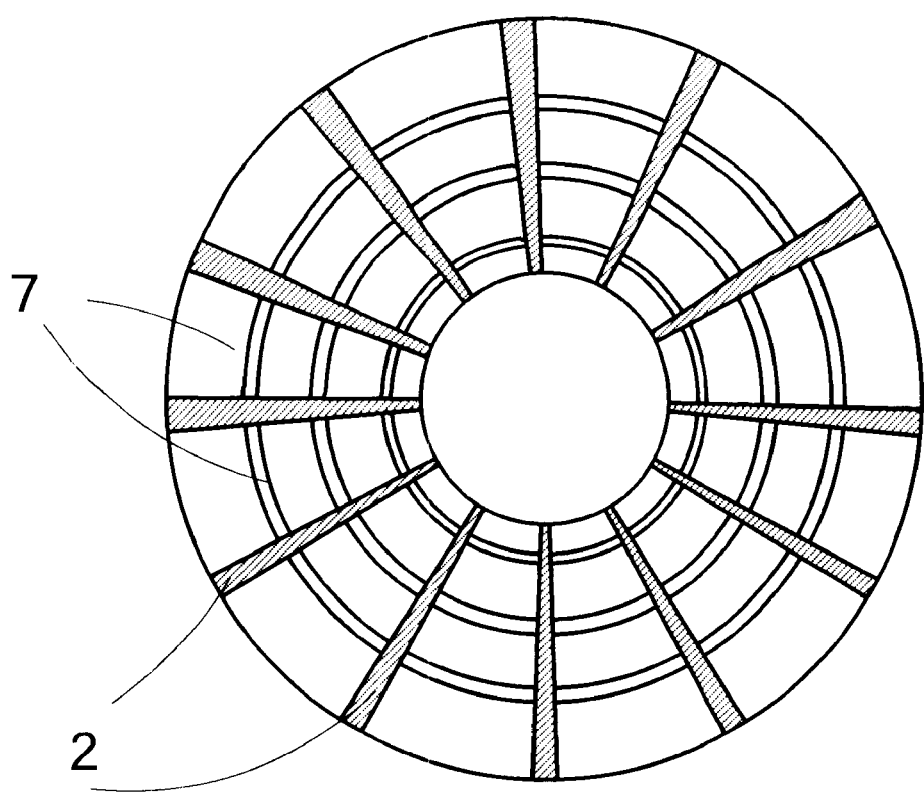
FIG. 3 represents plan views to explain still another example of the master carrier for magnetic transfer to be used in the magnetic transfer method of the present invention.

FIG. 3 is a plan view to explain still another example of the master carrier for magnetic transfer to be used in the magnetic transfer method of the present invention.

The servo areas 2 where servo signals of the master carrier 1 are recorded are designed in convex form with respect to the data areas. Further, concentric projections 7 are formed on data signal area of the master carrier for magnetic transfer. This makes it possible to prevent deformation, which occurs when the master carrier and the slave medium are brought into close contact with each other in the data signal area, occupying more than 90% of the area of the master carrier for magnetic transfer.

To form the master carrier for magnetic transfer of the present invention, various methods can be used: photo-fabrication method to perform photo-lithography on a substrate, and a method used for manufacture of a stamper to produce CD-ROM, i.e. a method to form a member for substrate by electroforming on a pattern produced by laser irradiation.

When it is produced by photo-fabrication, a nonmagnetic material with smooth surface such as silicon, quartz, glass, aluminum, synthetic resin, etc. is used as substrate, and a magnetic layer is formed on it.

More concretely, a photoresist is coated on the substrate, and a resist pattern to match the pattern formed by magnetic transfer is provided by pattern exposure or directly by marking-off.

In case of the pattern exposure, the pattern is formed on the substrate by reactive etching, or by physical etching using argon plasma or the like, or by chemical etching using etching solution.

Next, after forming a primer layer with a predetermined thickness by sputtering method, a magnetic material is formed as a magnetic layer.

Then, the photoresist is removed by lift-off method. It may be designed in such manner that only convex magnetic layer to be in contact with the slave medium in the magnetic transfer may be formed by photo-fabrication.

For the formation of the magnetic layer, it is preferable to provide a nonmagnetic primer layer giving magnetic anisotropy as desired, and crystal structure and lattice constant must be matched with those of the magnetic layer.

As the nonmagnetic primer layer, Cr, CrTi, CoCr, CrTa, CrMo, NiAl, Ru, etc. may be used.

Film thickness of the nonmagnetic primer layer is preferably in the range of 30–200 nm, or more preferably in the range of 50–150 nm.

The thickness of the magnetic layer is preferably in the range of 50–800 nm, or more preferably in the range of 100–500 nm.

More concretely, the following material may be used as the magnetic layer: Co, Co alloy (CoNi, CoNiZr, CoNbTaZr, etc.), Fe, Fe alloy (FeCo, FeCoNi, FeNiMo, FeAlSi, FeAl, or FeTaN), Ni, and Ni alloy (NiFe). Among these, it is preferable to use FeCo or FeCoNi.

Also, it is preferable to provide a hard carbon protective film such as diamond-like carbon (DLC) on the magnetic layer, or a lubricant layer may be provided on the hard carbon protective film.

As the protective film, it is preferable that a diamond-like carbon film of 5–30 nm and a lubricant are present.

The lubricant plays a role in preventing damage caused by friction when the master carrier and the slave medium are brought into close contact and the deviation caused during the contact process is to be compensated.

The master carrier for magnetic transfer can be produced by the method given below as in the case of the manufacture of a stamper for producing CD-ROM.

On a circular substrate made of quartz, glass, etc. with a lower surface roughness, photoresist is coated. On a photoresist layer processed by pre-baking, laser beam modulated to match the servo signal is irradiated while rotating the substrate. A pattern corresponding to the servo signal and extending in radial direction from the center of rotation is formed by exposure on the photoresist over the entire surface of the disk. After development, baking process is performed.

To form the projections, a photoresist layer corresponding to the difference of height between the projection and the servo area is provided. Then, light exposure and development are performed only for the servo area. Further, a photoresist layer corresponding to the height of the projection is provided, and pattern exposure and development are performed on the projection and the servo area. Thus, a projection with a desired height and the difference of height between the data area and the servo area can be obtained.

On the substrate where the predetermined pattern has been formed, a thin silver-plated or nickel-plated layer is provided by chemical plating or sputtering method. Using the thin silver-plated or nickel-plated layer as one of the electrodes, nickel is provided on the thin silver-plated or nickel-plated layer by electroforming, and a metal disk is prepared, which has a pattern to be formed when the nickel layer is detached from the substrate.

Next, on a metal disk having the pattern to match the signal, a magnetic layer is provided by vacuum deposition method. The magnetic layer may be formed by vacuum deposition method such as evaporation method, sputtering method, ion plating method, etc. In particular, it is preferable to use the sputtering method.

Next, a carbon film, e.g. diamond-like carbon, may be formed on the magnetic layer by the method such as sputtering.

Or, the metal disk formed by electroforming of nickel may be used as a casting mold, and electroforming of nickel may be performed. By this method, using the metal disk obtained in a single pattern forming process as a base mold, a multiple of master carriers for magnetic transfer can be produced.

As the slave medium to be used in the magnetic transfer method of the present invention, a magnetic recording medium for hard disk using a rigid base material, or a magnetic recording medium for floppy disk using a flexible material as base material may be used. A coating type magnetic recording medium with ferromagnetic metal particles dispersed in a binder, or a metal thin film type magnetic recording medium with ferromagnetic metal thin film formed on the substrate may be used.

More concretely, as the coating type magnetic recording medium, recording medium for Zip (Iomega Inc.), i.e. Zip 100, Zip 250, or magnetic recording medium such as high-density floppy disk called HiFD may be used.

As the magnetic material to be used in the metal thin film magnetic recording medium, Co, Co alloy (CoPtCr, CoCr, CoPtCrTa, CoPtCrNbTa, CoCrB, CoNi, etc.), Fe, or Fe alloy (FeCo, FePt, FeCoNi) may be used. For the purpose of performing satisfactory transfer operation, it is preferable that the material has high magnetic flux density and that it has magnetic anisotropy in the same direction as the magnetic layer of the master carrier for magnetic transfer, i.e. longitudinal direction in case of longitudinal recording, and normal direction in case of perpendicular recording.

Also, it is preferable to provide a nonmagnetic primer layer to give magnetic anisotropy as required—under the magnetic layer, i.e. on a layer closer to the substrate. It is preferable that crystal structure and lattice constant are well matched with those of the magnetic layer.

In the following, description will be given on examples and comparative examples to explain the features of the present invention.

EXAMPLE 1

On a 3.7 type disk made of synthetic quartz with surface roughness Ra of 0.2 nm, photoresist was coated by spin coating, and this was processed by pre-baking. The thickness of the photoresist after pre-baking was 60 nm. While this disk with photoresist was being rotated, laser beam modulated to correspond to servo signal was irradiated. Then, a pattern corresponding to the servo signal and extending in radial direction from the center of rotation was formed by exposure on a portion to match each frame on circumference on each track. This was developed using an alkali developing solution.

Each of the patterns thus formed was disposed in an area of 0.3 degree with spacing of 10 degrees. The patterns were formed in radial shape with equal spacing of 5 $\mu$m in width from the center to the position of 20–40 mm in radial direction. The spacing of the radial lines was set to 0.5 $\mu$m at the innermost position of 20 mm in radial direction.

Next, on the substrate where the pattern has been formed, a photoresist is coated again in thickness of 140 nm, and a pattern is formed again on the pattern previously formed on the servo area. On the data area between the servo areas, a projection of 100 $\mu$m in width is formed at a position of 20 nm in radius from the center. The projection is provided in radial form, and its line width is designed in such manner that it is increased with the increase of radius from the center.

After the surface of the photoresist was washed off, a nickel layer of 300 $\mu$m was formed by electroforming using the silver-plated layer as electrode. This was detached from the original disk, and a metal disk was prepared. Further, nickel layer was formed by electroforming using the metal disk as a casting mold, and a substrate for the master carrier for magnetic transfer was produced.

On the metal disk, a layer comprising a soft-magnetic layer and a FeCo layer (atom ratio 50:50) was prepared by sputtering at 25° C. Sputtering pressure was set to 1.5×10$^{-4}$ Pa (1.08 mTorr). Electric power was set to 2.80 W/cm$^2$.

The height of the servo area with respect to the data area was set to 200 nm, and difference of height between the servo area and the projection was set to 60 nm.

Next, as the slave medium, a coating type magnetic recording medium (Fuji Photo Film Co., Ltd.) for Zip 250 (Iomega Inc.) as commercially available was used. Coercive force Hc of the slave medium was 199 kA/m (2500 Oe).

Initial DC magnetization of the slave medium was performed using an electromagnet system so that peak magnetic field intensity will be 398 kA/m (5000 Oe; two times of Hc of the slave medium). Next, the slave medium processed by initial DC magnetization and the master carrier for magnetic transfer were brought into close contact with each other. Magnetic field of 199 kA/m (2500 Oe) was applied by the electromagnet system, and magnetic transfer was performed.

The slave medium thus obtained was evaluated by the evaluation method given below, and magnetic transfer information was evaluated. The results are shown in Table 1.

EXAMPLE 2

A master carrier for magnetic transfer was prepared in the same manner as in Example 1 except the following procedure: A pattern on the servo area of 60 nm in thickness was formed using a photoresist provided on the substrate. Then, a photoresist was coated again in thickness of 340 nm on the substrate where the pattern has been formed. A pattern was again provided on the pattern on the servo area previously formed. On the data area between the servo areas, projection of 100 μm in width at a position of 20 mm in radius from the center was provided. The height of the servo area with respect to the data area was set to 400 nm, and difference of height between the servo area and the projection was set to 60 nm. Evaluation was performed by the same procedure as in Example 1, and the results are shown in Table 1.

EXAMPLE 3

A master carrier for magnetic transfer was prepared in the same manner as in Example 1 except the following procedure: A pattern on the servo area of 60 nm in thickness was formed using a photoresist provided on the substrate. Then, a photoresist was coated again in thickness of 690 nm on the substrate where the pattern has been formed. A pattern was again provided on the pattern on the servo area previously formed. On the data area between the servo areas, projection of 100 μm in width at a position of 20 mm in radius from the center was provided. The height of the servo area with respect to the data area was set to 750 nm, and difference of height between the servo area and the projection was set to 60 nm. Evaluation was performed by the same procedure as in Example 1, and the results are shown in Table 1.

EXAMPLE 4

A master carrier for magnetic transfer was prepared by the same procedure as in Example 1 except that the photoresist was coated only once in thickness of 200 nm and that no projection was formed. Evaluation was made by the same procedure an in Example 1, and the results are shown in Table 1.

EXAMPLE 5

A master carrier for magnetic transfer was prepared by the same procedure as in Example 2 except that the photoresist was coated only once in thickness of 400 nm and that no projection was formed. Evaluation was made by the same procedure an in Example 1, and the results are shown in Table 1.

EXAMPLE 6

A master carrier for magnetic transfer was prepared by the same procedure as in Example 3 except that the photoresist was coated only once in thickness of 750 nm and that no projection was formed. Evaluation was made by the same procedure an in Example 1, and the results are shown in Table 1.

Comparative Example 1

A master carrier for magnetic transfer was prepared in the same manner as in Example 1 except the following procedure: The height of the data area was set to the same as the height of the servo area, and no projection was formed. After silver was plated by chemical plating, a nickel layer was formed in thickness of 300 μm by electroforming using the silver-plated layer as electrode. Then, it was detached from the original disk, and the metal disk was used as the substrate for the master carrier for magnetic transfer. Evaluation was made by the same procedure as in Example 1, and the results are shown in Table 1.

Comparative Example 2

A master carrier for magnetic transfer was prepared by the same procedure as in Example 4 except that the photoresist was coated only once in thickness of 20 nm and the servo area was set to a height 20 nm higher than the data area. Evaluation was made by the same procedure as in Example 1, and the results are shown in Table 1.

Comparative Example 3

A master carrier for magnetic transfer was prepared in the same manner as in Example 1 except the following procedure: A pattern of 60 nm in thickness was formed on the servo area using a photoresist provided on the substrate. Then, a photoresist was coated again in thickness of 890 nm on the substrate where the pattern has been formed, and a pattern was formed again on the servo area where the pattern was provided previously, and the height of the servo area was set to a height 950 nm higher than the height of the data area. Evaluation was made by the same procedure as in Example 1, and the results are shown in Table 1.

Comparative Example 4

A master carrier for magnetic transfer was prepared by the same procedure as in Example 1 except that the photoresist was coated only once in thickness of 950 nm on the substrate and the height of the servo area was set to a height 950 nm higher than the height of the data area, and that no projection was formed. Evaluation was made by the same procedure as in Example 1, and the results are shown in Table 1.

Evaluation Methods (1) Evaluation of signal dropout and adhesion

A magnetic developing solution (Sigmarker Q; Sigma Hichemical) was diluted by 10 times, and this was dropped on the slave medium processed by magnetic transfer. After drying and developing, the change at the end of the magnetic transfer signal was evaluated. Servo areas were examined in 100 visual fields under differential interference type microscope with magnification of ×50. If there were two or more signal dropouts, it was defined as "good".

(2) Signal Distortion

Signal distortion of transfer signal on the slave medium was evaluated using an electromagnetic transfer characteristics measuring system (SS-60; Kyodo Electronics). An inductive head with head gap of 0.17 μm and track width of 4.0 μm was used as the head. Reproduction signal was examined, and the reproduction signal was read on a digital oscilloscope (LC334AM; Lecroy Corp.), and the distortion was evaluated from half-value (PW50) of the signal. If PW50 was less than 300 nm, it was defined as "good". If it was 300 nm or more, it was defined as "no good".

TABLE 1

|  | Projection on data area | Difference in height (nm) Servo/data | Difference in height (nm) Servo/projection | Number of dropouts | Signal distortion (nm) |
|---|---|---|---|---|---|
| Example 1 | Present | 200 | 60 | 2 Good | 280 Good |
| Example 2 | Present | 400 | 60 | 1 Good | 291 Good |
| Example 3 | Present | 750 | 60 | 1 Good | 296 Good |
| Example 4 | Not present | 200 | — | 1 Good | 290 Good |
| Example 5 | Not present | 400 | — | 2 Good | 294 Good |
| Example 6 | Not present | 750 | — | 2 Good | 298 Good |
| Comparative example 1 | Not present | — | — | 43 No good | 272 Good |
| Comparative example 2 | Present | 20 | — | 4 No good | 294 Good |
| Comparative example 3 | Present | 950 | 60 | 0 Good | 342 No good |
| Comparative example 4 | Not present | 950 | 0 | 0 Good | 350 No good |

By the magnetic transfer method using the master carrier for magnetic transfer of the present invention, stable magnetic transfer can be performed on a disk medium such as hard disk, large-capacity removable disk, large-capacity flexible medium, etc. within short time and with high productivity. No decrease in quality of recording such as signal dropout occurs in the pre-format recording of servo signal for tracking, address information signal, reproduction clock signal, etc.

What is claimed is:

1. A magnetic transfer method for transferring information by bringing a master carrier for magnetic transfer and a slave medium into close contact with each other and by applying a magnetic field for transfer, said master carrier comprising servo areas and data areas, said servo areas are convex, and difference of height between the data areas and the servo areas is within the range of 50–800 nm.

2. A magnetic transfer method according to claim 1, wherein said data comprises projections not higher than the height of the servo areas.

3. A magnetic transfer method according to claim 1, wherein said slave medium is selected from a hard disk, a large-capacity removable disk medium, or a large-capacity flexible medium.

* * * * *